United States Patent [19]
Burgin

[11] 3,766,664
[45] Oct. 23, 1973

[54] GRAIN CIRCULATING SYSTEM

[76] Inventor: Kermit H. Burgin, R.R. 1, Whitestown, Ind.

[22] Filed: Aug. 8, 1972

[21] Appl. No.: 278,753

[52] U.S. Cl................ 34/182, 34/102, 214/17 DA, 222/410
[51] Int. Cl........................................... F26b 11/08
[58] Field of Search.................... 214/17 D, 17 DA; 34/102, 182; 222/410–412

[56] References Cited
UNITED STATES PATENTS

| | | | |
|---|---|---|---|
| 3,648,896 | 3/1972 | Baltz | 214/17 DA X |
| 2,969,156 | 1/1961 | Miller et al. | 214/17 DA |
| 3,580,428 | 5/1971 | Garber | 222/410 X |
| 3,563,399 | 2/1971 | Shivers | 214/17 DA X |
| 3,540,604 | 11/1970 | Hyttinen | 214/17 D |

FOREIGN PATENTS OR APPLICATIONS

| | | | |
|---|---|---|---|
| 1,092,839 | 11/1960 | Germany | 214/17 D |

Primary Examiner—Robert G. Sheridan
Attorney—William R. Coffey

[57] ABSTRACT

A particulate material storing and moving apparatus comprising an upstanding bin defining a center vertical axis, a concentric circular floor for the bin, the floor having an outer peripheral portion and a center portion, the floor being supported for movement about the center axis, and a driver for moving the floor about the axis. Conveyors are provided for moving such material from the center portion either upwardly to the top of the bin or downwardly and outwardly to the outside of the bin, the conveyors having entry ends disposed adjacent the center portion and discharge ends. Particulate material movers are carried on the floor to be movable therewith, the movers being proportioned and designed to move the material radially inwardly toward the center portion as the floor rotates. The movers on the floor sweep underneath the material and move it radially inwardly.

14 Claims, 19 Drawing Figures

Patented Oct. 23, 1973 3,766,664

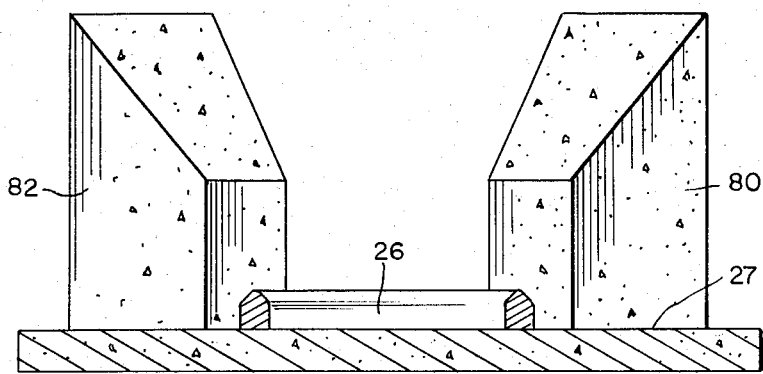
Fig. 3
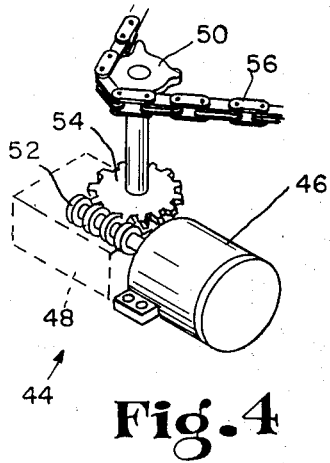
Fig. 4
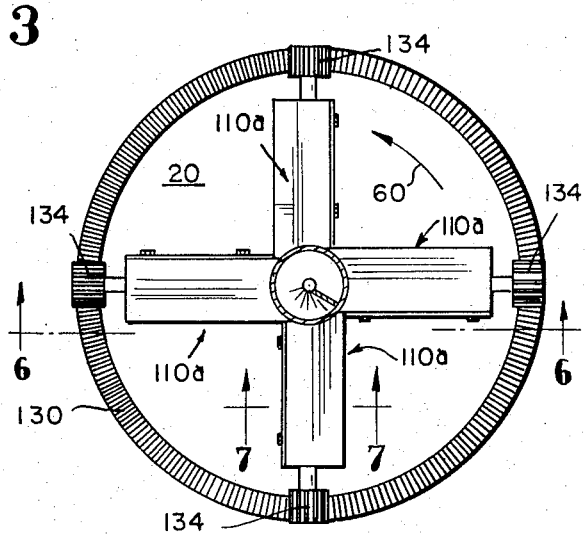
Fig. 5
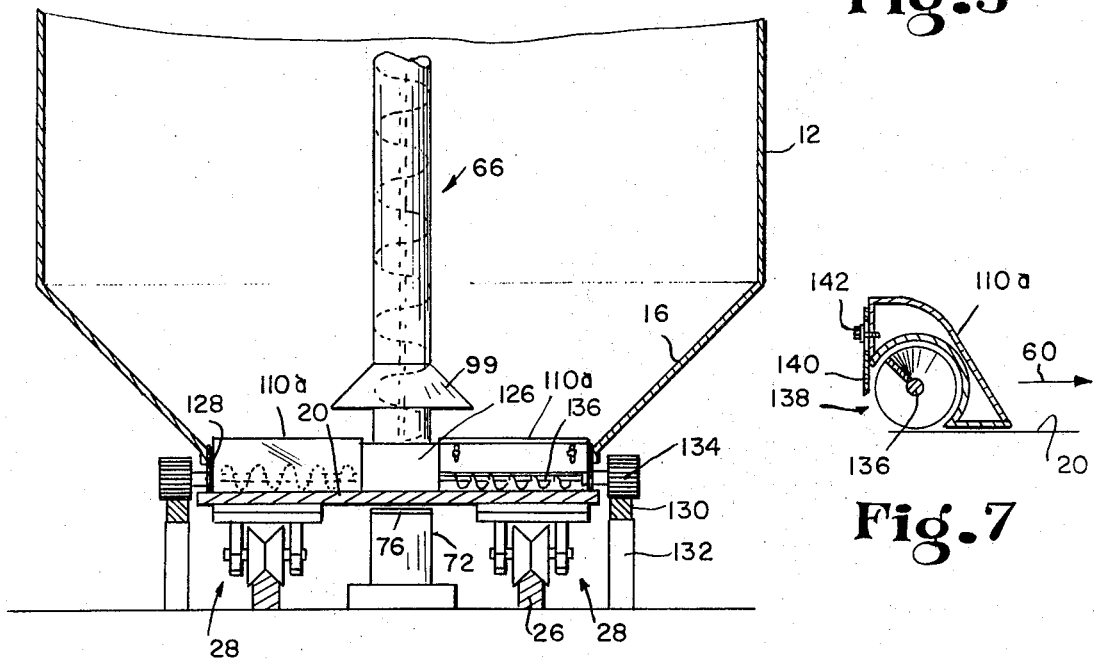
Fig. 6
Fig. 7

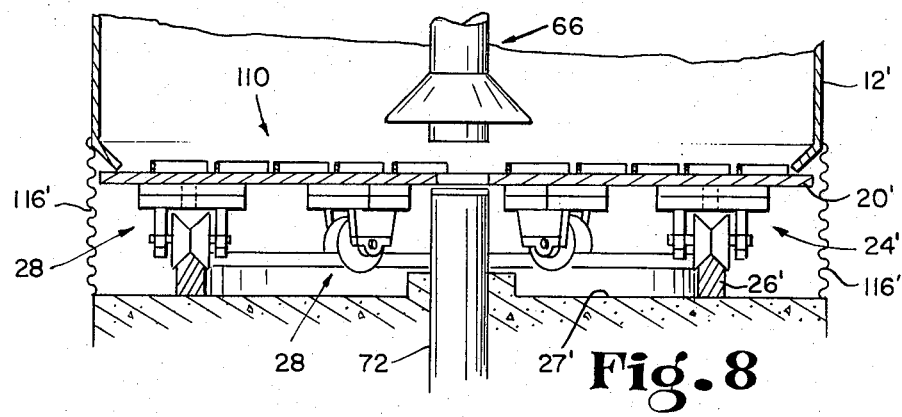
Fig. 8
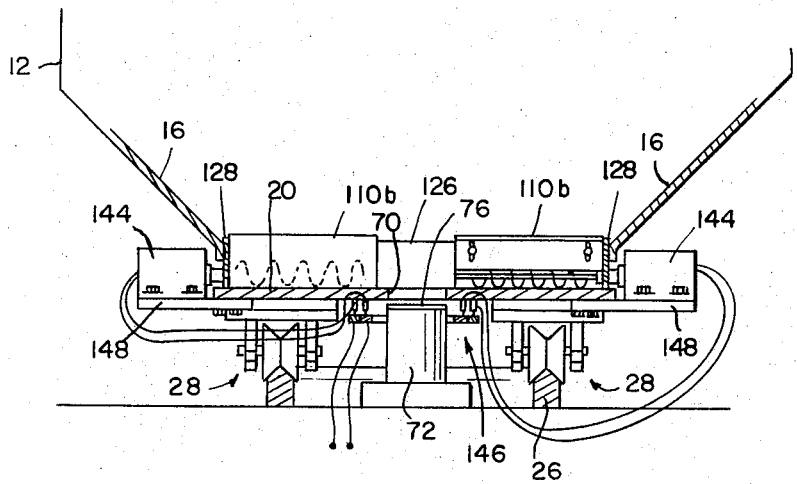
Fig. 9
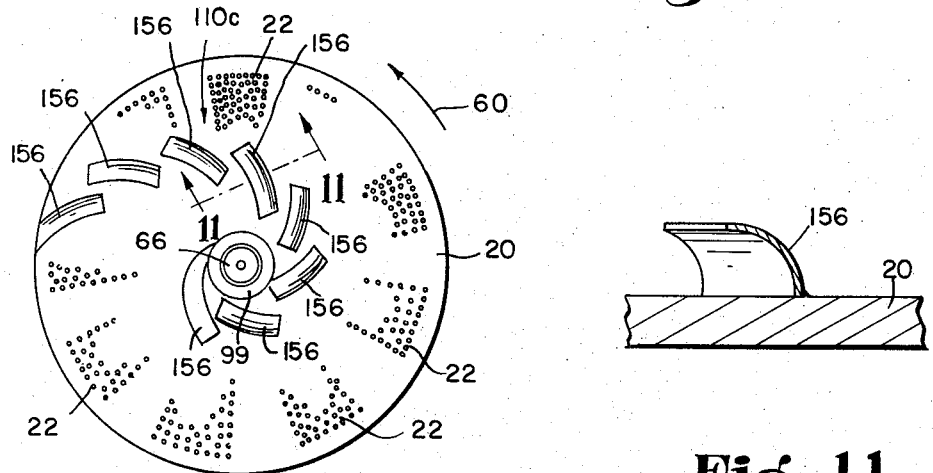
Fig. 10
Fig. 11

Patented Oct. 23, 1973 3,766,664

GRAIN CIRCULATING SYSTEM

BACKGROUND OF THE INVENTION

This invention relates generally to grain drying bins and drying apparatus associated therewith, and more particularly to the provision of an apparatus arranged, when in one mode of operation, to circulate the grain within the bin and, in its other mode of operation, to unload the grain from the bin.

Reference is made to U.S. Pat. Nos. 3,487,961 and 3,538,618 as well as to my prior U.S. Pat. No. 3,357,110. These prior patents establish well-known reasons for circulating the grain within a storage bin while the grain is being dried. It is conventional to have a storage bin with a perforated floor through which heated air may flow to dry the grain. Usually, bins are constructed to have such a perforated floor elevated a distance above the ground, and warm air is forced into the bin in the space under the floor. This warm air moves up through the floor and through the grain and out through the exhaust openings in the top of the bin. If the grain is not circulated from the bottom of the bin to the top of the bin during this drying process, the grain at the bottom will be overdried before the grain at the top is dried to the desired degree. Several systems have been proposed for circulating the grain from the bottom of the bin to the top of the bin. The systems shown in the prior patents cited above are representative.

Many problems have been encountered in manufacturing and using such prior art circulating and moving systems. My present invention provides solutions to these problems.

It is an object of my present invention to provide, for use with an upstanding bin defining a center vertical axis, a concentric circular floor having an outer peripheral portion and a center portion, means for supporting the floor for movement about the axis, means for driving the floor about the axis, conveyor means for moving the particulate material from the center portion of the floor, the conveyor means having an entry end and a discharge end, the entry end being positioned adjacent the center portion to receive material therefrom, and means on the floor and movable therewith for moving such particulate material radially inwardly toward the center portion as the floor rotates. Preferably, the floor may be perforated so that heated dry air may be blown therethrough upwardly through the material in the bin.

It is an object of the present invention to provide such an apparatus in which the said moving means on the floor includes vanes carried by the floor, the vanes being proportioned and designed to engage and move the grain radially inwardly from the outer peripheral portion of the floor to the center portion where it is picked up and moved by the conveyor means either upwardly to the top of the bin or downwardly and outwardly to the outside of the bin.

Another object of the present invention is to provide such an apparatus in which said moving means includes vane means spiraling about the center axis and progressing radially inwardly. Said vane means may include a plurality of vanes carried by the floor, each vane having a leading portion, intermediate portion and trailing portion, the trailing portion being disposed at a first radial distance from the axis and the leading portion being disposed at a second and greater radial distance from the axis.

Still another object of my present invention is to provide such an apparatus in which the floor is provided with a generally radially extending slit through which the grain drops, and the said moving means on the floor includes means for receiving such dropping grain. The receiving means may include auger means carried underneath the floor and arranged to move the grain dropping through the slit radially inwardly toward the center portion.

Another object of the present invention is to provide such an apparatus in which the said moving means on the floor includes at least one radially outwardly extending auger and means for driving the auger to move such material radially inwardly, the auger having a radially outer portion adjacent the outer peripheral portion and a radially inner portion adjacent said center portion.

As this description progresses, it will be appreciated that one of the basic objects of the present invention is to provide a grain circulating system or storing and moving apparatus which is quite simple in operation, positive in action, dependable in operation, easy to maintain, and very effective for the purpose of removing the grain from the bottom of the bin so that it can be recirculated to the top of the bin or conveyed to another bin or truck.

Other objects and features of the present invention will become apparent as this description progresses.

To the accomplishment of the above and related objects, this invention may be embodied in the forms illustrated in the accompanying drawings, attention being called to the fact, however, that the drawings are illustrative only, and that change may be made in the specific constructions illustrated and described, so long as the scope of the appended claims is not violated.

In the drawings:

FIG. 3 is a fragmentary sectional view taken from FIG. 2 generally along the line 3—3;

FIG. 4 is a fragmentary perspective view showing one means for driving the floor;

FIG. 5 is a plan view of another embodiment of the present invention showing a plurality of radially extending augers carried on the floor for movement therewith;

FIG. 6 is a fragmentary sectional view taken along the line 6—6 in FIG. 5;

FIG. 7 is a fragmentary sectional view taken along the line 7—7 in FIG. 5;

FIG. 8 is a fragmentary sectional view of another embodiment of the present invention wherein the floor diameter is approximately equal to the diameter of the bin;

FIG. 9 is a fragmentary sectional view of another embodiment of the present invention wherein the augers carried on the floor for movement therewith are driven by electrical motors carried by the floor;

FIG. 10 is a plan view of the floor of another embodiment of the present invention including a plurality of spiral vanes on the floor for moving the grain inwardly as the floor rotates;

FIG. 11 is a sectional view taken along the line 11—11 in FIG. 10;

Figure 1:
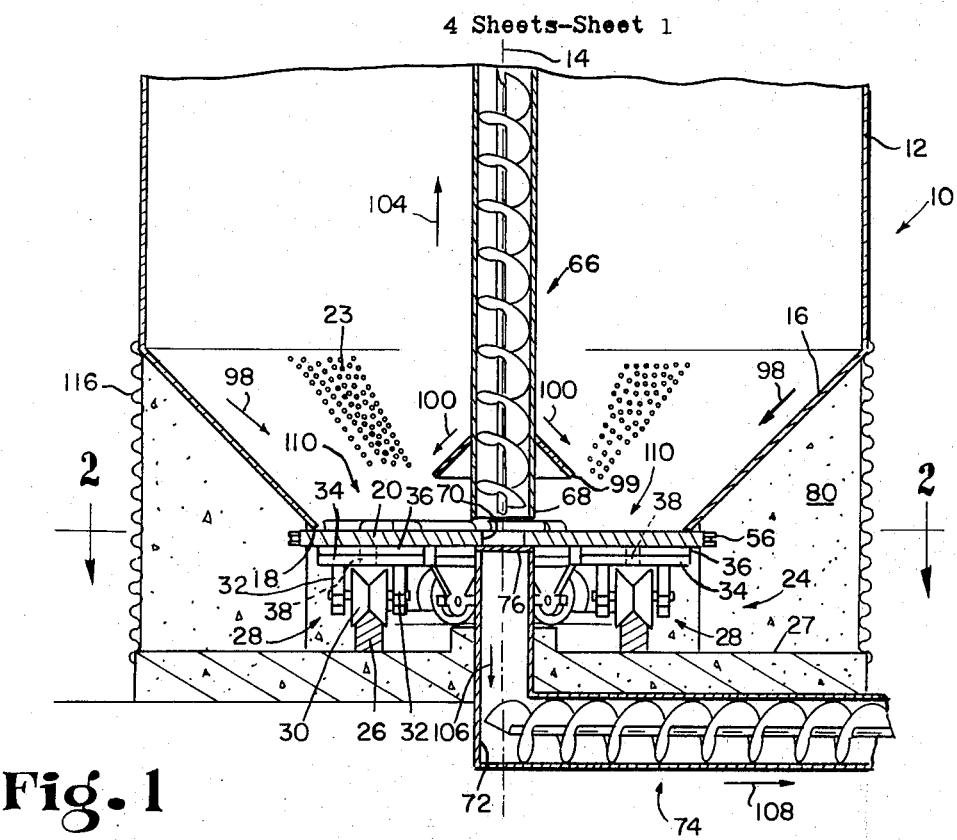
FIG. 1 is a fragmentary sectional view of the apparatus of the present invention with a storage bin designed to be particularly suitable to the apparatus.
Figure 2:
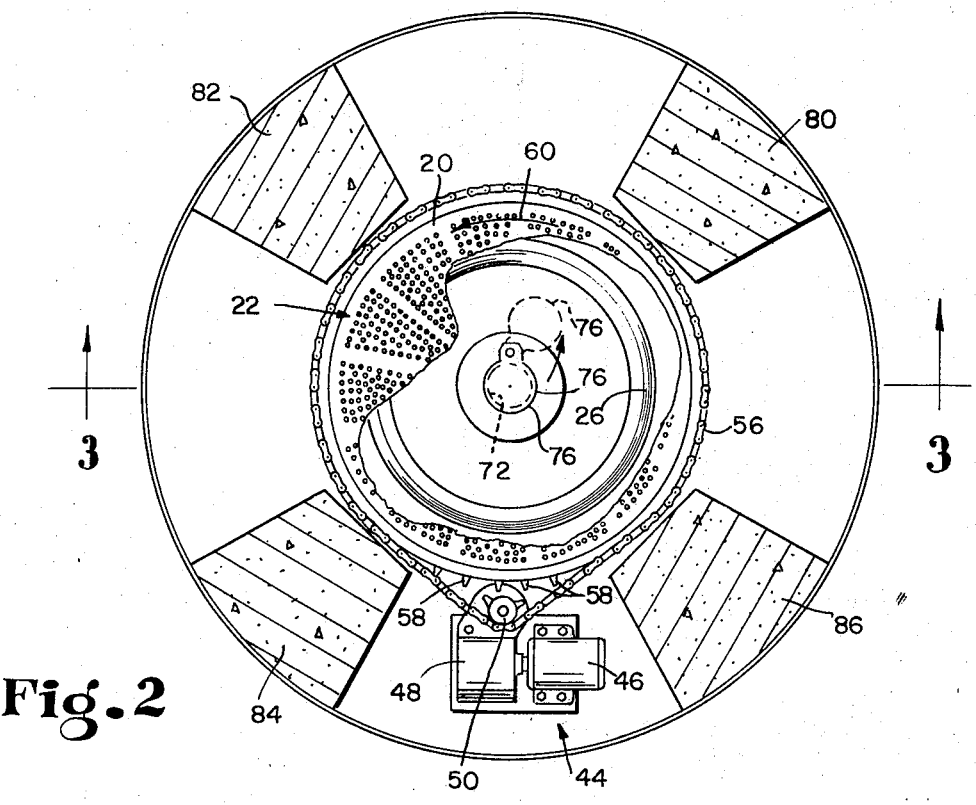
FIG. 2 is a sectional view taken from FIG. 1 generally along the line 2—2.

Turning now to the drawings, and particularly to FIGS. 1, 2 and 3, it will be seen that I have shown such an apparatus, indicated generally at 10, including a cylindrical bin 12 defining a center, vertically extending axis 14, the lower wall portion 16 of the bin being concentrically conically shaped to funnel grain inwardly and downwardly. The lower, peripherally extending edge 18 of the lower portion 16 is adjacent the top surface of the floor 20 and particularly the outer peripheral edge portion of the floor. This floor 20, which rotates about the axis 14 as will be described, is perforated or at least portions of the floor 20 are perforated as indicated by the reference numeral 22 so that air can move therethrough. Because the floor is a structural member which moves, it may be preferable to have several radially extending pie-shaped sections on the floor perforated with structural members of the floor extending between the pie-shaped sections. Further, portions of the lower portion 16 may be perforated as indicated at 23 so that air can move therethrough.

Means indicated generally at 24 is provided for supporting the floor 20 for rotation about the axis 14, the illustrative means including a concentric track ring 26 on which a plurality of wheel assemblies 28 ride. Each of these illustrative wheel assemblies includes a wheel 30 journal mounted on an axle extending between a pair of flanges 32 depending from a support block 34. The support block 34 is provided with an upwardly facing, horizontally extending bearing surface which engages a downwardly facing bearing surface of a block 36 attached rigidly to the floor. A vertically downwardly extending trunnion 38 extends through a bearing opening in the block 34, and the block 34 may swivel slightly about this trunnion relative to the block 36 as the floor 20 rotates.

Means such as indicated generally by the reference numeral 44 is provided for driving the floor 20 about the axis 14, the illustrative means 44 including an electrical motor 46 and gear reduction 48 drivingly connected to the motor and having an output sprocket 50. As indicated in FIG. 4, the gear reduction 48 may include a worm 52 driven by the motor 46 and a worm gear 54 meshed with the worm. The sprocket 50 may be directly drivingly connected to the worm gear 54. A chain 56 may be trained about the floor 20 to engage lug teeth 58 carried by the floor as well as the sprocket 50. Thus, when the motor is energized, the floor is driven, for instance, in the direction of the arrow 60.

I may provide a conveyor means, such as the illustrated auger means 66, for lifting the grain from the center portion of the floor 20 vertically upwardly to the top of the bin 12. It will be seen that the auger means 66 has an entry end 68 adjacent the center portion of the floor 20 so that the grain moving to the center portion of the floor will be lifted upwardly to be distributed at the top of the bin or to be conveyed out of the bin. Further, I may provide the center of the floor 20 with a concentric opening 70 which will permit the grain to drop through a chute or tube 72 to a laterally extending auger or auger means 74 so that the grain may be moved laterally outwardly from underneath the bin. I show a cover 76 for the opening 70 so that the opening may be closed when the auger means 66 is being used.

The illustrative bin 10 rests upon a concrete foundation including the floor portion 27 on which the track 26 rests and upwardly extending peripherally spaced apart pedestals such as indicated at 80, 82, 84, 86. These illustrative pedestals are formed at their top to conform to the shape of sections of the lower portion 16. The spacing of the pedestals 80–86 is such that maintenance personnel can enter the space beneath the bin 12 to maintain the equipment such as the equipment which movably supports the floor. For instance, periodically a maintenance man may enter the space beneath the bin to lubricate the wheel assemblies 28 as well as the drive means 44. It will be appreciated that such maintenance may be carried on while the bin is loaded, and this is an important distinction over prior art systems which include mechanism which extends upwardly into the grain.

The apparatus of the present invention may be constructed for use with bins of various sizes. For instance, while the drawings accompanying the present application are not necessarily drawn to scale, the rotary floor 20 may have a diameter of, for instance, 14 feet while the diameter of the bin 10 may be, for instance, 30 feet. In the embodiment of FIG. 8, with like parts being identified by like reference numerals primed, the floor 20' is approximately the same diameter as the bin.

The floors of larger diameters may be supported, for instance, on wheel assemblies 28 which run on two or more concentric track rings 26. While the illustrative means 24 is advantageous because of its simplicity, ease of maintenance, and durability, it will be appreciated that other means for supporting the floor 20 for rotation may be used in accordance with the present invention. For instance, the floor may be rotatably supported by a plurality of rollers which are journal mounted about radially extending axes and which roll upon a floor such as the upper surface of the floor portion 27.

While the illustrative chain 56 extends peripherally about the floor, it will be appreciated that this arrangement is merely illustrative and that a much shorter continuous length of chain may be used by training the chain about pulleys and sprockets such that the chain drivably engages only a few of the peripherally spaced apart lugs 58 at a time.

It will be appreciated that the grain will move in the direction of the arrows 98 down the surface of the lower portion 16 toward the floor 20. A conically shaped baffle 99 may be placed on the lower end of the auger 66 as illustrated to cause the grain to flow downwardly and outwardly in the direction of the arrows 100 to keep the grain from packing in and about the center portion of the floor 20. The grain may be moved directly upwardly from this center portion in the direction of the arrow 104 by means of the auger 66. Means, not shown, may be provided at the top of the bin to scatter the grain conveyed upwardly by the auger means 66. Alternatively, the cover 76 may be opened to permit the grain to drop from the center portion of the floor in the direction of the arrow 106 downwardly through the tube 72 to be moved in the direction of the arrow 108 by the auger means 74. Thus, the apparatus of the present invention may be used to recirculate the grain within the bin, i.e., to take it from the bottom of the bin and to scatter it on the top, or to unload the bin by removing the grain from the bottom and conveying it out of the bin to a truck or another bin.

In accordance with the present invention, means, indicated generally by the reference numeral 110, are provided on the floor 20 for moving the grain radially inwardly toward the center portion of the floor. The means 110, which will be described in detail hereinafter, are connected to the floor for movement therewith and proportioned and designed to engage the grain and move it radially inwardly as the floor rotates.

The rotation of the floor 20 will, of course, cause a considerable stirring action of the grain in the bin. It is believed that this will tend greatly to reduce the formation of hot spots in the mass of grain within the bin. The formation of such hot spots is recognized to be one of the problems with conventional equipment. Thus, the rotating floor 20 not only is effective to remove the grain from the bottom of the bin, it is effective to swirl the grain or a considerable portion of the grain within the bin about the axis 14.

In FIG. 1, I show a corrugated metal wall 116 closing the space under the bin 10 to provide a chamber into which warm dry air can be introduced for drying purposes. This warm, dry air will move through the perforations 22 and 23 and up through the grain which is being circulated by rotation of the floor 20 and operation of the auger means 66.

Turning now to FIGS. 5, 6 and 7, one embodiment of the present invention will be discussed, this embodiment comprising radially extending augers 110a mounted on the floor 20 for movement therewith about the axis of the floor. Each of these augers 110a is driven to move the grain radially inwardly toward the center portion of the floor 20. The radially inner end of each auger is in communication with a circular chamber 126. The upwardly extending auger means 66 lifts the grain out of this chamber. Alternatively, the cover 76 can be opened to drop the grain through the tube 72.

I show an upstanding wall 128 extending peripherally about the floor 20 to provide a sort of rotary seal between the floor and the lower portion 16 of the bin. The augers may be driven, for instance, by means of a rack gear 130 which extends peripherally about the outer edge of the floor and which may be supported by means such as indicated at 132. A gear 134 mounted on the outer end of the shaft 136 of the auger as illustrated may be meshed with the rack 130 to rotate as the floor rotates, thereby to drive the auger. The augers 110a, therefore, sweep underneath the grain and the grain dropping downwardly behind the augers moves into the augers through the opening 138 (FIG. 7) which extends along the length of the auger. An adjustment plate 140 is selectively adjustably fastened to the auger by a fastening element such as indicated at 142 so that the amount of grain flowing into the auger may be controlled by raising and lowering the plate.

While I have shown four radially extending augers 110a in the embodiment of FIGS. 5 and 6, it will be appreciated that the number of such augers may be varied to suit the requirements. Only two of such augers or even only one of such augers may well perform the function of sweeping underneath the bottom layers of the grain to move the grain radially inwardly. It will further be appreciated that the rack and gear system for driving the augers is merely illustrative and that the augers may be driven by a number of different techniques including the technique shown in FIG. 9. Referring to FIG. 9, it will be seen that an electric motor 144 is provided for driving each auger 110b, the motor being mounted on the floor for movement therewith. Slip rings indicated generally at 146 may be provided for energizing the motors. The motors 144 are shown mounted on support arms 148 extending outwardly from the floor.

Further, the augers 110a or 110b may be driven by placing a bevel gear on the radially inner ends of each of the shafts 136 and engaging those bevel gears with a stationary bevel gear mounted on a vertical axis. In such a system, rotation of the floor will cause the augers to rotate.

Turning now to FIGS. 10 and 11, it will be seen that I have shown another embodiment of my present invention, this embodiment including movers indicated generally by the reference numeral 110c. The movers of this embodiment include a plurality of vanes mounted on the floor 20 for movement therewith, each vane 156 being proportioned and designed to engage the grain and move it radially inwardly as the floor rotates. The illustrative vanes 156 are disposed in a radially decreasing spiral path about the axis 14 of the floor 20 with each vane being formed to spiral about the axis progressively inwardly toward the center portion. Each vane 156 is formed such that a radial section taken along its length will define an arcuate segment curving upwardly from the floor 20 and forwardly in the direction of rotation (arrow 60) of the floor. It will be seen that the vanes 156 are arranged in an overlapping spiral pattern such that each vane 156 moves grain radially inwardly to a point where it is picked up and moved by the following vane. The last vane 156 in the series, therefore, moves the grain to the point where it can be picked up and moved upwardly by the auger 66 or dropped through the tube 72 to the auger 74.

Each vane 156, therefore, is likened to a cutting edge of a spiral end mill in that, as the floor 20 rotates in the direction of the arrow 60, each vane will cut into the grain and cause it to move radially inwardly. Each vane 156 has a leading portion, intermediate portion and trailing portion, the trailing portion being disposed at a first radial distance from the axis of the floor and the leading portion being disposed at a second and greater radial distance from the floor. Since the intermediate portion is generally spirally formed about the axis progressively from the leading portion to the trailing portion, each vane will move the grain from its radially outer extent to its radially inner extent.

The amount of grain that will be moved for each revolution of the floor 20 will depend upon the height of the vanes 156 and their efficiency at moving the grain.

It will be appreciated that, theoretically, the amount of grain that can be moved inwardly by the vanes 156 each revolution can be calculated by multiplying the height of the vanes by the area of the floor 20. The limiting factor, of course, is the ability of the auger 66 or the auger 74 to convey the grain away from the center portion of the floor.

Figure 12:
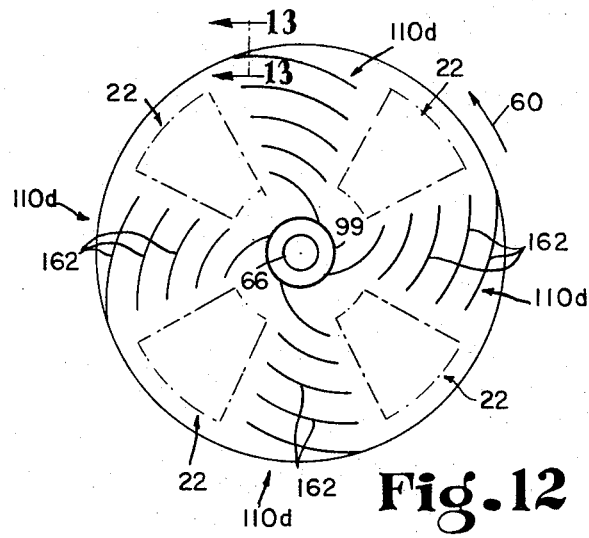
FIG. 12 is a plan view of the floor of another embodiment of the present invention including a plurality of spirally formed vanes for moving the grain inwardly as the floor rotates.
Figure 13:
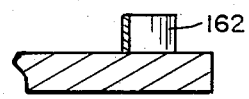
FIG. 13 is a fragmentary sectional view taken along the line 13—13 in FIG. 12.

Turning now to FIGS. 12 and 13, it will be seen that I have shown another embodiment including four sets of movers indicated generally by the reference numerals 110d. Each set of movers 110d includes a series of upwardly extending, spirally formed vanes 162, each of which progresses radially inwardly from its leading edge to its trailing edge. The radially innermost vane 162 of each set of vanes is proportiond and designed to move the grain engaged thereby radially inwardly to the center portion of the floor to be removed either by the auger means 66 or the auger means 74. As shown in FIG. 13, each vane may be a strip of steel spirally formed and then welded or otherwise securely fastened to the floor 20 for movement therewith. Each section of the vane 162 may extend vertically upwardly as illustrated in FIG. 13. The height of the vanes may be selected to give the desired results. For instance, in some cases, it may be desirable more quickly to draw the grain from the outer peripheral edge portion of the floor 20 than from the intermediate peripheral portions of the floor. This may be done by having the radially outer vanes 162 higher than the radially inner vanes. Further, the baffle 99 may be enlarged in diameter to cause the grain dropping from the center of the bin to be deflected radially outwardly to a greater extent.

Figure 14:
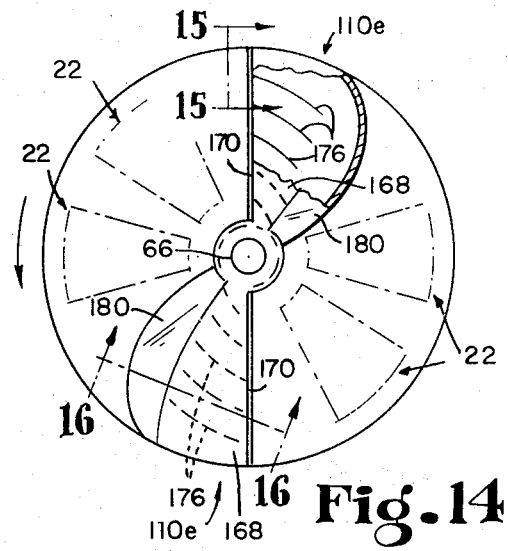
FIG. 14 is a plan view, partially cut away, of the floor of another embodiment of the present invention.
Figure 15:
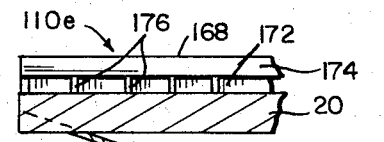
FIG. 15 is a fragmentary sectional view taken along the line 15—15 in FIG. 14.
Figure 16:
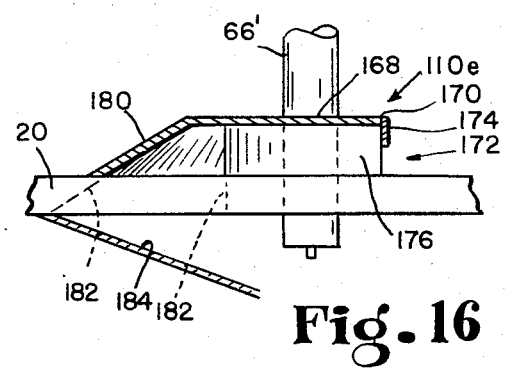
FIG. 16 is a fragmentary sectional view taken along the line 16—16 in FIG. 14.

Turning now to FIGS. 14, 15 and 16, another embodiment of the present invention including movers indicated generally by the reference numerals 110e will be discussed. Each mover or moving means 110e comprises means on the floor defining a chamber on the floor extending radially outwardly from the center portion. In the illustrative embodiment, this chamber has an upper wall 168 having a radially extending leading edge or forward edge 170 bounding a radially extending intake opening 172 into the chamber. The expanse of this opening may be controlled by, for instance, a vertically extending gate 174, a cross section of which is shown in FIG. 16. The illustrative means 110e further includes a plurality of vanes 176 extending upwardly from the floor 20 to the upper wall portion 168 and serving to support the wall portion 168 under the pressure of the grain as well as to deflect the grain moving into the opening 172 radially inwardly. The vanes 176, therefore, are similar to the vanes 162 in the embodiment of FIG. 12.

Each illustrative means 110e further includes a trailing wall portion 180 which is proportioned and designed to engage the grain moving into the chamber and to move it radially inwardly. The illustrative wall portions 180 are sprially formed to progress radially inwardly as illustrated. Further, in the illustrative embodiment, the floor 20 is provided with an opening 182 under the trailing wall portion 180 and through which grain drops onto a floor 184 which spirally inclines radially inwardly toward the center axis of the floor. Thus, the grain which moves into the opening 172 as the floor rotates moves rearwardly and inwardly as guided by the vanes 176 to the point where it is moved further inwardly by the trailing wall portion 180 and floor 184. The auger 66', in this embodiment, may be disposed to lift the grain from beneath the center portion of the floor as illustrated in FIG. 16. Of course, the grain may be conveniently dropped into the auger 74.

In the embodiment of FIGS. 14, 15 and 16, the amount of grain which will be moved radially inwardly during each revolution of the floor 20 will be determined by the height of the opening 172 of each means 110e. The height of this opening may be adjusted so that the amount of grain moving radially inwardly can be accommodated by the auger 66 or the transverse auger 74.

Figure 17:
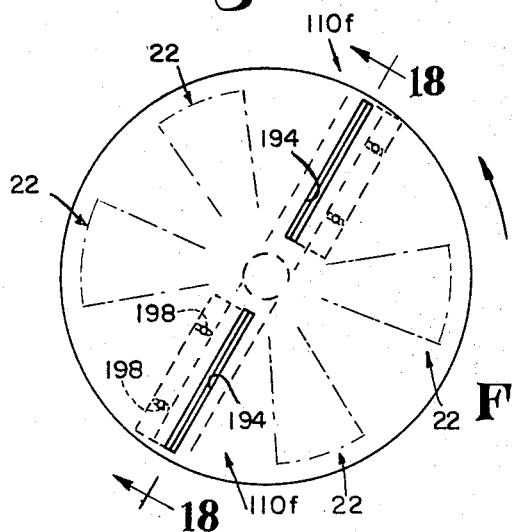
FIG. 17 is a plan view of a floor in still another embodiment of the present invention, the embodiment including slits in the floor through which the grain drops.
Figure 18:
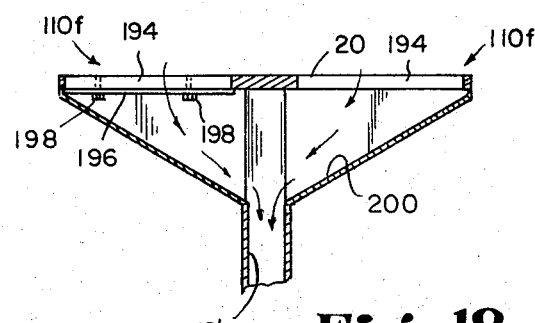
FIG. 18 is a sectional view taken along the line 18—18 in fig. 17 and showing one means for moving the grain falling through the slits radially inwardly.

Turning now to FIGS. 17 and 18, another embodiment of my invention including the mover means 110f will be discussed. In this embodiment, the floor 20 is provided with a pair of diametrically oppositely disposed, generally radially extending slits 194 through which the grain drops into receiving means disposed beneath the floor. As illustrated, each radially extending slit 194 extends from the outer peripheral portion of the floor to a point adjacent the center portion. Means, such as the illustrated plate 196, are provided for selectively adjustably closing each slit 194 to meter the flow of grain therethrough. In the illustrative embodiment, fastening elements 198 extend up through elongated slots in each plate 196 to hold the plate in the desired location.

The grain dropping through each slit 194 drops into a chute 200 which conveys the grain radially inwardly and downwardly to the tube 72' which leads to the transverse auger means 74. The plates 176 may be adjusted to meter the flow of grain up to the capacity of the auger means carrying the grain away from the center portion of the floor.

Figure 19:
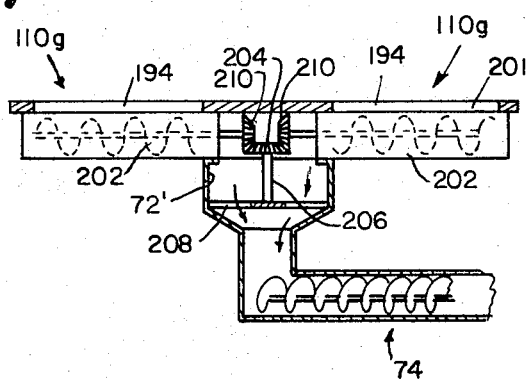
FIG. 19 is a sectional view similar to FIG. 18 and showing another means for moving the grain falling through the slits radially inwardly.

In the embodiment of FIG. 19, which includes the mover means 110g, the receiving means below each slit 194 is an auger means 202 arranged to receive the grain and to move it radially toward the center portion of the floor to drop the grain through the tube 72' into the intake end of the transverse auger means 74. The augers 202 may be driven by means of a stationary bevel gear 204 mounted on a vertically extending trunnion 206 supported by a frame 208 formed with openings therein through which the grain can drop. A bevel gear 210 is then mounted on the radially inner end of each auger 202 shaft to be engaged with the stationary gear 204 such that it will rotate when the floor and the auger is driven about the axis of the bevel gear 204.

One advantage of the auger system shown in FIG. 19 is that the augers 202 are disposed below the floor so that they can be easily maintained and repaired if need be while the bin is full of grain.

With the above description in mind, several advantages of the system of my present invention can be appreciated. First of all, the embodiments including the stationary vanes extending upwardly from the floor into the grain are ideal from a maintenance standpoint. Nothing which moves and which must, therefore, be lubricated, adjusted, or otherwise maintained, extends into the grain. The floor rotates, but the portions of the floor which might require maintenance as well as the supporting means for the floor are disposed beneath the bin. In a conventional manner, the auger 66 may be repaired by leaving its outer tube within the grain and pulling the axle on which the spiral flight is disposed upwardly from the top of the bin and then reinserting the axle into the tube.

Further, the vanes which extend upwardly from the floor tend to stir the lower layers of grain as well as to move the grain radially inwardly. This, of course, is advantageous in reducing or preventing hot spots.

It will be appreciated that the illustrative lifting auger 66 may be replaced, in some embodiments, by a conveyor including a continuous chain fitted with spaced apart buckets, such a conveyor being shown in my prior U.S. Pat. No. 3,357,110.

Further, in some embodiments, it may be desirable to have the floor at least slightly conically shaped with its center portion lower than its outer peripheral portion so that there is a natural tendency for the grain to move radially inwardly.

It will be appreciated that my rotating floor system may be used, for instance, as a blending or mixing apparatus. Different types of grain, for instance, can be deposited on the floor from chutes so that the rotation of the floor and the vanes on the floor will move the grain together and mix it together. The structure of FIG. 12, for example, may well be used to blend or mix two or more types of grain which are deposited on the floor from chutes. The mixed grain may be dropped through the tube 72 to be conveyed, for instance, to a hammermill.

It will further be appreciated that, for instance, the vanes 162 are proportioned and designed such that, when the floor is driven in a clockwise direction (FIG. 12), the grain on the floor will be moved radially outwardly, for instance, to a conveyor trough which extends peripherally about the floor.

In some cases, it may be desirable to provide means for preventing the grain from rotating with the floor 20, particularly when the level of grain in the bin 10 gets quite low and it is desired completely to emplty the bin. One such means might be an arm hinged at one end so that it is movable from its normal vertically-extending position to its operable horizontally-extending position just above the surface of the floor. Such an arm could be hinged, for instance, to the lower end of the auger means 66 so that it could be lowered to a position parallel with the floor and just above the floor to resist rotation of the grain so that the grain will be engaged and moved inwardly by the moving means on the floor.

I claim:

1. Grain drying and storing apparatus comprising an upstanding bin defining a center vertical axis, a concentric circular floor for said bin, said floor defining an upper wall of a chamber for receiving drying air, said floor having an outer peripheral portion and a center portion, and said floor having perforations therein for the passage of drying air upwardly therethrough, means for supporting said floor for movement about said axis, means for driving said floor about said axis, conveyor means for removing grain from said center portion, said conveyor means having an entry end and discharge end, said entry end being positioned adjacent said center portion to receive grain therefrom, and means on said floor and movable therewith for moving grain radially inwardly toward said center portion as said floor rotates, said means on said floor including upwardly projecting vane means spiraling about said axis and progressing radially inwardly from said outer peripheral portion to engage grain on and just above said floor to move it radially inwardly to said center portion and over said perforations.

2. Grain drying and storing apparatus comprising an upstanding bin defining a center vertical axis, a concentric circular floor for said bin, said floor defining an upper wall of a chamber for receiving drying air, said floor having an outer peripheral portion and a center portion, and said floor having perforations therein for the passage of drying air upwardly therethrough, means for supporting said floor for movement about said axis, means for driving said floor about said axis, conveyor means for removing grain from said center portion, said conveyor means having an entry end and discharge end, said entry end being positioned adjacent said center portion to receive grain therefrom, and means on said floor and movable therewith for moving grain radially inwardly toward said center portion as said floor rotates, said means on said floor including a plurality of upwardly projecting vanes carried by said floor, each vane having a leading portion, intermediate portion and trailing portion, said trailing portion being disposed at a first radial distance from said axis and said leading portion being disposed at a second and greater radial distance from said axis, whereby the grain on and just above said floor is moved radially over said perforations toward said center portion.

3. The apparatus of claim 2 in which said intermediate portion is generally spirally formed about said axis progressively from said leading portion to said trailing portion.

4. The apparatus of claim 2 in which each vane extends upwardly from said floor and peripherally and radially inwardly from its said leading portion to its trailing portion.

5. Grain drying and storing apparatus comprising an upstanding bin defining a center vertical axis, a concentric circular floor for said bin, said floor defining an upper wall of a chamber for receiving drying air, said floor having an outer peripheral portion and a center portion, and said floor having perforations therein for the passage of drying air upwardly therethrough, means for supporting said floor for movement about said axis, means for driving said floor about said axis, conveyor means for removing grain from said center portion, said conveyor means having an entry end and discharge end, said entry end being positioned adjacent said center portion to receive grain therefrom, and means on said floor and movable therewith for moving grain radially inwardly toward said center portion as said floor rotates, said bin being formed to provide a lower portion which is concentrically conically shaped to funnel grain inwardly and downwardly toward the outer peripheral portion of said floor and an upper portion which is concentrically cylindrically shaped, said means on said floor including upwardly projecting vane means spiralling about said axis and progressing radially inwardly to engage grain on and just above said floor to move it radially inwardly to said center portion and over said perforations.

6. The apparatus of claim 5 in which said vane means includes a plurality of vanes carried by said floor, each vane having a leading portion, intermediate portion and trailing portion, said trailing portion being disposed at a first radial distance from said axis and said leading portion being disposed at a second and greater radial distance from said axis.

7. Grain drying and storing apparatus comprising an upstanding bin defining a center vertical axis, a concentric circular floor for said bin, said floor defining an upper wall of a chamber for receiving drying air, said floor having an outer peripheral portion and a center portion, and said floor having perforations therein for the passage of drying air upwardly therethrough, means for supporting said floor for movement about said axis, means for driving said floor about said axis, conveyor means for removing grain from said center portion, said conveyor means having an entry end and discharge end, said entry end being positioned adjacent said center portion to receive grain therefrom, and means on said floor and movable therewith for moving grain radially inwardly toward said center portion as said floor rotates, said means on said floor including vanes carried by said floor to engage and move the grain just above and on said floor radially inwardly over said perforations to be picked up by said conveyor means, each said vane being disposed on said floor to spiral about said axis progressively inwardly toward said center portion, each said vane being formed such that a radial section taken along its length will define an arcuate segment curving upwardly from said floor and forwardly in the direction of rotation of said floor.

8. Grain drying and storing apparatus comprising an upstanding bin defining a center vertical axis, a concentric circular floor for said bin, said floor defining an upper wall of a chamber for receiving drying air, said floor having an outer peripheral portion and a center portion, and said floor having perforations therein for the passage of drying air upwardly therethrough, means for supporting said floor for movement about said axis, means for driving said floor about said axis, conveyor means for removing grain from said center portion, said conveyor means having an entry end and discharge end, said entry end being positioned adjacent said center portion to receive grain therefrom, and means on said floor and movable therewith for moving grain radially inwardly toward said center portion as said floor rotates, said means on said floor including means defining a chamber on said floor and extending radially outwardly from said center portion and a radially extending intake opening through which such material moves into said chamber, said chamber being proportioned and designed to move such material received therein toward said center portion.

9. The apparatus of claim 8 in which said chamber defining means includes an upper wall having a leading edge portion bounding said intake opening, and a trailing wall portion proportioned and designed to engage and move such material radially inwardly.

10. The apparatus of claim 9 in which said chamber defining means includes a plurality of radially spaced apart vanes extending upwardly from said floor to said upper wall portion.

11. The apparatus of claim 10 in which each of said vanes extends from a point adjacent said intake opening rearwardly toward said trailing wall portion and radially inwardly toward said center portion.

12. The apparatus of claim 9 in which said trailing wall portion is spirally formed to progress radially inwardly.

13. The apparatus of claim 12 in which said chamber defining means includes a floor portion adjacent said trailing wall portion and inclining radially inwardly and downwardly.

14. Grain drying and storing apparatus comprising a circular floor for receiving grain thereon, said floor defining an upper wall of a chamber for receiving drying air, said floor having a center axis, an outer peripheral portion and a center portion, and said floor having perforations therein for the passage of drying air upwardly therethrough, means for supporting said floor for movement about said axis, means for driving said floor about said axis, conveyor means for moving grain from said floor, and upwardly projecting vane means on said floor and movable therewith for engaging and moving grain toward said conveyor means and over said perforations as said floor rotates.

* * * * *